United States Patent [19]
Waters

[11] 4,344,178
[45] Aug. 10, 1982

[54] COSTAS LOOP QPSK DEMODULATOR

[75] Inventor: George W. Waters, Indialantic, Fla.

[73] Assignee: Harris Corporation, Melbourne, Fla.

[21] Appl. No.: 190,914

[22] Filed: Sep. 26, 1980

[51] Int. Cl.³ .................. H03D 3/18; H03D 3/24; H04L 27/22
[52] U.S. Cl. .................. 375/81; 329/50; 329/124; 375/86; 455/208
[58] Field of Search .................. 329/50, 122, 124; 375/77, 81, 86, 85; 455/202, 208, 209

[56] References Cited
U.S. PATENT DOCUMENTS

| | | | |
|---|---|---|---|
| 3,638,125 | 1/1972 | Goell | 375/81 |
| 3,701,948 | 10/1972 | McAuliffe | 375/77 |
| 4,085,378 | 4/1978 | Ryan et al. | 329/124 |
| 4,092,606 | 5/1978 | Lovelace | 329/124 |

Primary Examiner—Benedict V. Safourek
Attorney, Agent, or Firm—Craig and Antonelli

[57] ABSTRACT

A decision-directed Costas loop demodulator, rather than employing decision circuits, i.e. sample and hold circuits, in the path of each of the I and Q channels, contains a single sample and hold circuit at the output of the crosstalk measurement subtraction circuitry that drives the VCO. Functionally, the same decision-directed sampling process that is carried out by dual channel approach is achieved, yet because the decision/sampling circuitry is located downstream of the crosstalk measurement subtraction circuit, it operates on a relatively slowly varying error signal rather than on the rapidly varying I and Q channel signals.

8 Claims, 4 Drawing Figures

COSTAS LOOP QPSK DEMODULATOR

FIELD OF THE INVENTION

The present invention relates to communication systems and is particularly related to a demodulation arrangement employing a Costas demodulator loop for demodulating quadraphase shift keyed signals.

BACKGROUND OF THE INVENTION

To meet the increasing demand for high data rate communication capability, transmission systems often employ phase shift or frequency shift keying systems that are readily adapted for digital signal interfacing and processing. In quadraphase shift keyed data transmission, that are particularly useful in this regard, demodulation schemes have included the so-called Costas demodulation approach as a highly desirable technique for data recovery and signal tracking.

A basic configuration of Costas demodulator loop, such as described in U.S. Pat. No. 4,085,378 to Ryan et al., is illustrated in FIG. 1. Referring to the Figure, an incoming signal is coupled over a line 10 to one input of each of a pair of phase detectors 11 and 12. To a second input of each phase detector there is applied a carrier reference signal from a voltage controlled oscillator 22, with phase shifter 13 imparting a 90° phase shift to the reference applied to detector 11. Phase detectors 11 and 12 effectively multiply the input signal by the pair of reference carriers, one of which is offset by 90°, or in phase quadrature, to the other by virtue of the $\pi/2$ phase shifter 13, to produce a pair of demodulated signals that are then coupled through low pass filters 14 and 15 (removing the double frequency component of the VCO) to provide a pair of baseband outputs representative of the signal contents of the I and Q channels. In order to provide a control reference for the VCO 22, a signal indicative of the cross talk between the channels is obtained, and the VCO is driven so as to minimize the channel cross talk, it being assumed that minimizing channel cross talk will yield the correct frequency and phase of VCO 22 for proper demodulation. For this purpose, the respective channel outputs of filters 14 and 15 are applied to one input of each of respective multipliers 17 and 19. The I and Q channel signals are also coupled through hard limiters 16 and 18 to provide sign inputs to multipliers 19 and 17, respectively. The outputs of cross channel multipliers 17 and 19 are then subtracted from one another in subtractor 20 to provide a measure of the cross talk and thereby an error signal for controlling the VCO 22. This error signal is coupled through a loop filter 21 to the control input of the VCO 22.

In order to improve upon the signal-to-noise ratio, improvements on this basic Costas loop design have included configurations such as those described in the United States Patents to Monrolin U.S. Pat. No. 4,100,499 and Washio et al. U.S. Pat. No. 4,134,075, which are effectively decision-directed schemes. These approaches employ delays in the respective I and Q channels, whereby previous data decisions, that offer the advantage that the value of the data at its best S/N point can be utilized, are employed.

FIG. 2 shows a scheme that is basically described in the Monrolin patent involving the insertion of a delay element in the path of each channel and a sampling circuit in the cross-multiplier path. As shown in FIG. 2, a Q-channel one-half bit delay circuit 23 is coupled in the quadrature (Q) channel path between the output of filter 14 and an input of multiplier 17, and an I-channel one-half bit delay circuit is coupled in the in-phase (I) channel path between the output of filter 15 and an input of multiplier 19. Typically, the delay imparted by each delay circuit is T/2 where T is the signalling period. A pair of sampling circuits, such as D-type flip-flops 25 and 26 are coupled between limiters 16 and 18 and second inputs of multiplier 19 and 17, respectively. The clock signals for defining the signal sampling instants are supplied on line 35 from a suitable clock recovery device (not shown). Unfortunately, with this type of system, an analog delay line, such as a section of coaxial cable, is employed, so that the bandwidth of the system is limited.

In addition, due to the length of the delay line required, this type of system is impractical at all but the highest bit rates. For example, at a specific bit rate of 10 Mbps, a coaxial cable ten meters in length is required.

An improvement on the above-described delay-line implemented decision-directed scheme involves the use of sample and hold circuits in place of the delay lines themselves, as shown in FIG. 3. Namely, in place of the one-half bit delay circuits shown in FIG. 2, respective sample and hold circuits 31 and 32 are employed, with the sampling times being controlled by the recovered clock in line 30.

Now, as well as using the value of the data decision at the best signal-to-noise point, this scheme also uses the value of analog data at its best signal-to-noise point. Although this approach provides a very good S/N ratio, it suffers from the fact that very fast and accurate sample and hold circuits are necessary. Namely, the analog sample and hold circuits must store the sampled analog value of the previous bit for one bit time, then slew to a new value, e.g. from a "one" to a "zero" at the start of the next sample time. During the time that the slew is occurring a totally erroneous signal may be generated at the output of subtractor 20. In order to avoid degradation, this slew must be accomplished in a period of time that is negligible compared to the bit time, for example less than one-percent of the bit time. For the very high data rates demanded by present-day communication systems (e.g. above 50 Kbps), this approach is exceedingly difficult and complex to implement, and for higher data rates such an implementation is not feasible.

SUMMARY OF THE INVENTION

In accordance with the present invention there is provided an arrangement for achieving the advantages of decision-directed Costas loop demodulation employing sample and hold decision components without suffering from the above-mentioned drawback of complexity and difficulty in implementation. To this end, rather than employ decision circuits, i.e. the sample and hold circuits, in the path of each of the I and Q channels, the configuration according to the invention contains a single sample and hold circuit at the output of the cross talk measurement subtraction circuitry that drives the VCO. Functionally, the same decision-directed sampling process that is carried out by dual channel approach is achieved, yet because the decision/sampling circuitry is located downstream of the cross talk measurement subtraction circuit, it operates on a relatively slowly varying error signal rather than on the rapidly varying I and Q channel signals. As a result, a simpler and less costly sample and hold circuit than would otherwise be required may be used.

DETAILED DESCRIPTION

Figure 1:
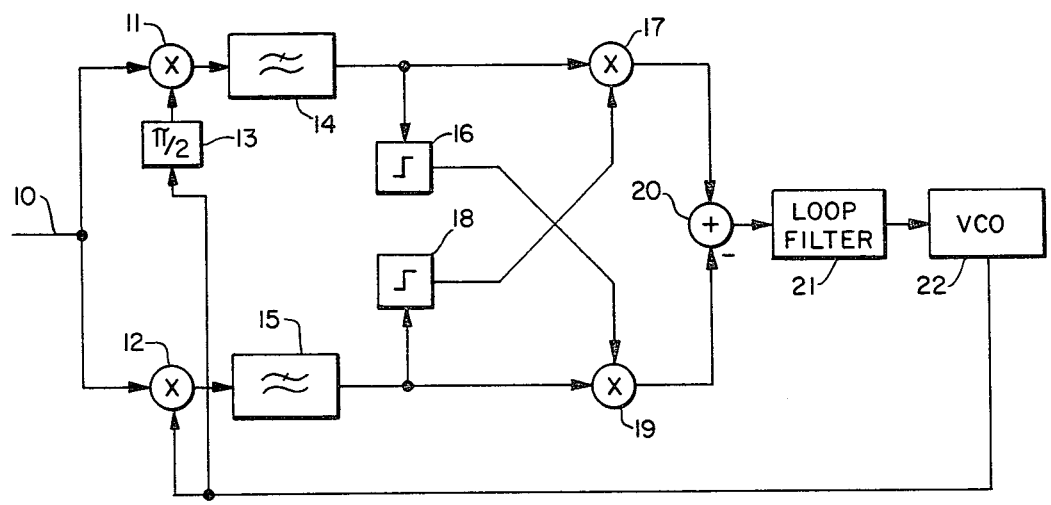
FIG. 1 is a circuit block diagram of a conventional Costas loop demodulator.
Figure 2:
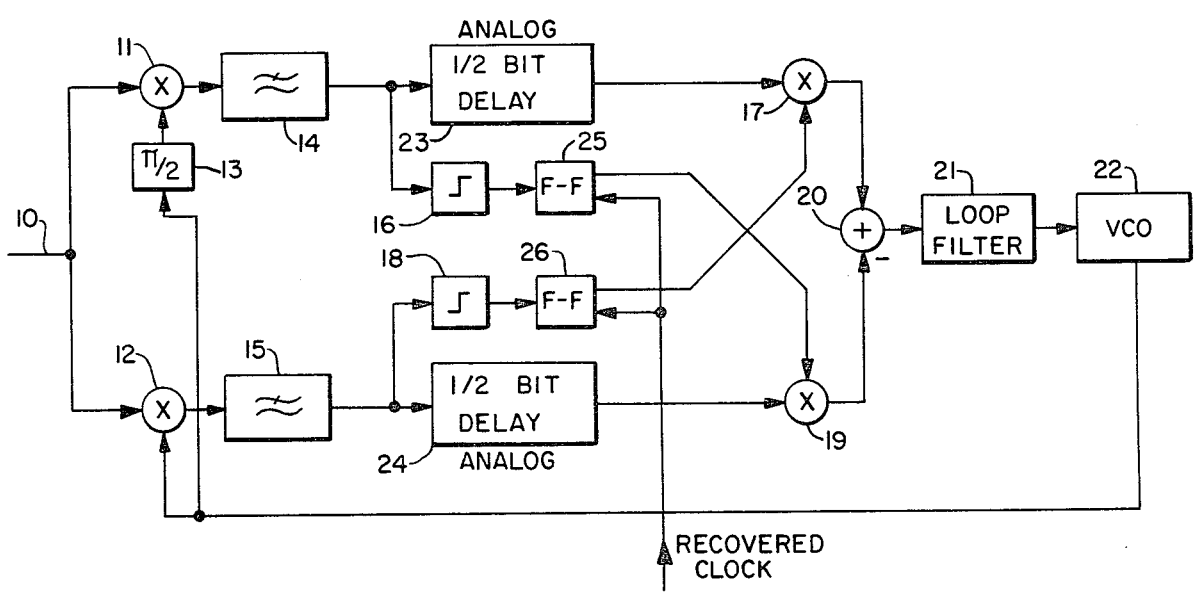
FIG. 2 is a circuit block diagram of a conventional decision-directed Costas loop demodulator employing an analog delay line.
Figure 3:
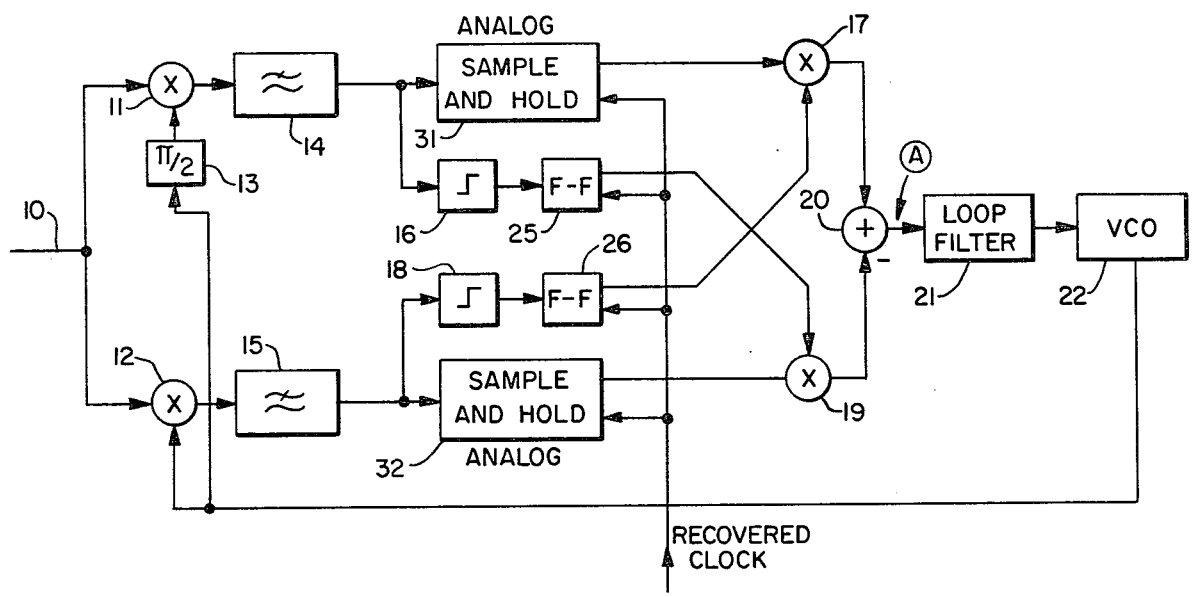
FIG. 3 is a circuit block diagram of a conventional decision-directed Costas loop demodulator employing sample and hold circuits.
Figure 4:
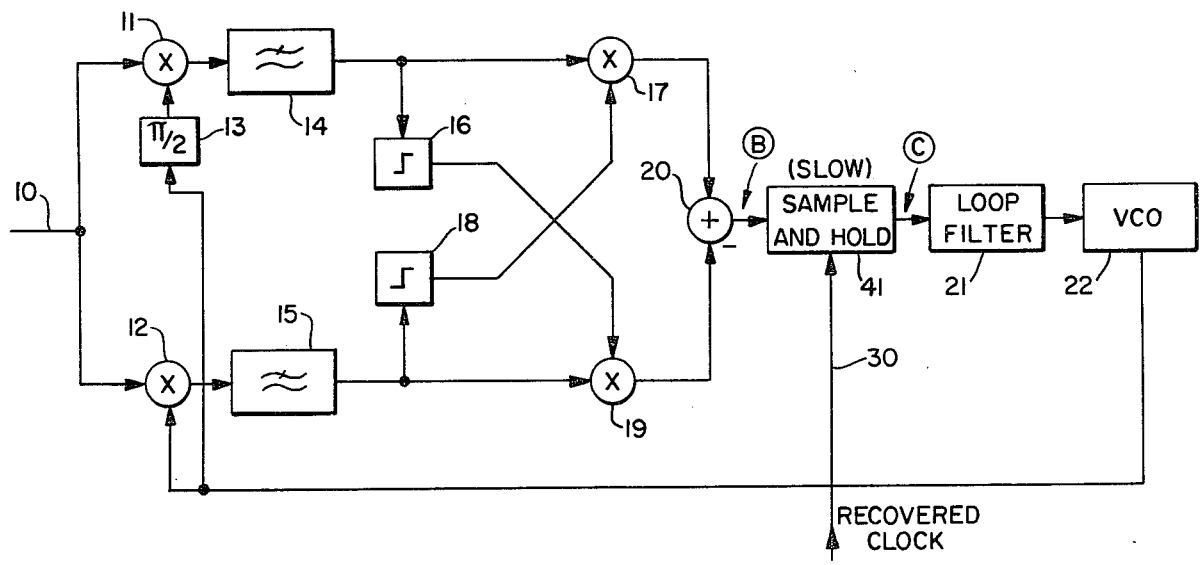
FIG. 4 is a circuit block diagram of a decision-directed Costas loop modulator according to the present invention.

Referring now to FIG. 4, there is shown a circuit block diagram of the improved Costas loop demodulator in accordance with the present invention. In the Figure, those components which correspond to like components in the prior art implementations described previously with respect to FIGS. 1 through 3 are identified by the same reference numbers and will not be redescribed here. Basically, the inventive loop configuration corresponds to the arrangement shown in FIG. 1, with the addition of an individual sample and hold circuit 41 disposed between the output of subtraction circuit 20 and the input of loop filter 21. The sampling control signal for sample and hold circuit 41 is derived from the recovered clock on line 30, as it is for the pair of sample and hold circuits of the decision-directed Costas loop configuration described above with reference to FIG. 3. In order to provide a full appreciation of the advantages of the improved configuration shown in FIG. 4, a comparison of its operation and advantages relative to that shown in FIG. 3 will be explained.

In order to demonstrate that the configuration of FIG. 4 produces a control output to VCO 22 that is functionally equivalent to the decision-directed configuration of FIG. 3, consider the expression for the error signal at the output of subtractor 20 in each implementation. At point A in FIG. 3 the error component (ERROR) may be represented by the expression:

$$\text{ERROR} = (I_{to} \text{ analog}) \times (Q_{to} \text{ sign}) - (Q_{to} \text{ analog}) \times (I_{to} \text{ sign}) \quad (1)$$

wherein $I_{to}$ analog is the value of I analog at the optimum sampling time to, $Q_{to}$ analog is the value of Q analog at the optimum sampling time to, $I_{to}$ sign is polarity of $I_{to}$ analog at the optimum sampling time to, and $Q_{to}$ sign is the polarity of Q to analog at the optimum sampling time to.

At point B in FIG. 4, the signal component may be represented by the expression:

$$\text{SIGNAL AT B} = (I_t \text{ analog}) \times (Q_t \text{ sign}) - (Q_t \text{ analog}) \times (I_t \text{ sign}). \quad (2)$$

By virtue of its operation, sample and hold circuit 41 freezes the value at time to, so that the output (C) of sample and hold circuit 41 may be represented by the expression:

$$\text{SAMPLE AND HOLD OUTPUT} = [(I_t \text{ analog}) \times (Q_t \text{ sign}) - (Q_t \text{ analog}) \times (I_t \text{ sign})] \text{ at } t = to. \quad (3)$$

Since expression (3) equates with expression (1) it can be seen that the improved inventive configuration of FIG. 4 effectively produces the same VCO control signal as the prior art configuration of FIG. 3.

As explained previously in the decision-directed embodiment of the prior art shown in FIG. 3, each of the sample and hold circuits 31 and 32 operates on a large amplitude rapidly changing data signal. The error signal provided at the output of subtractor 20 is obtained by subtracting these two rather large I and Q channel signals, making it necessary to employ very fast and very accurate sample and hold circuits. On the other hand, in the inventive implementation illustrated in FIG. 4, the sample and hold circuit 41 operates directly on the error signal. Since the error signal is relatively small and slowly varying, a less accurate and slower sample and hold circuit than employed in each I and Q channel of FIG. 3 can be used in the embodiment shown in FIG. 4, in order to achieve the same accuracy on the error signal, as two large sample and hold outputs are no longer being subtracted.

With the error signal being small and slowly varying, the output of sample and hold circuit 41 now has to slew only from one error value to the next. Unlike the prior art configuration of FIG. 3, no erroneous outputs occur during the slewing, so that the output of sample and hold circuit 41 may be allowed a significant portion of the bit time to change value. The only effect is a slight filtering of the error signal which turns out to be of no consequence. As a result, a relatively slow sample and hold circuit may be used.

As will be appreciated from the foregoing description, pursuant to the present invention, there is provided an improved decision-directed Costas loop demodulator that is capable of operating at high data rates, but does not require the extremely fast and accurate sample and hold circuitry in its implementation. Not only the complexity, but also the number of circuit components employed is reduced. Thus, the invention is a particularly cost-effective implementation.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. For use in a multiphase shift keying demodulator of the type including a phase adjustable reference carrier source, and means for demodulating an incoming signal with said reference carrier to provide first and second signals respectively representing the in-phase and quadrature components of said incoming signal, an improved phase synchronization system for controlling said reference carrier comprising, in combination:

first means, responsive to said first and second signals, for detecting the polarities thereof and producing in-phase and quadrature signal signals;

second means, coupled to receive said first signal and said quadrature sign signal, for producing a first product signal, and coupled to receive said second signal and said in-phase sign signal, for producing a second product signal, third means, coupled to said second means, and responsive to said first and second product signals, for producing and error signal representative of the difference between said first and said second product signals, and fourth means, coupled to said third means, for sampling said error signal and holding the sampled error signal, said sampled and hold signal being coupled to said adjustable reference carrier source to control the phase thereof.

2. A system according to claim 1, wherein said incoming signals are quadraphase shift keyed modulated signals.

3. A system according to claim 1, wherein said fourth means comprises a sample and hold circuit the sampling rate of which is controlled in accordance with the data rate of said incoming signals.

4. A system according to claim 3, wherein the acquisition time of said sample and hold circuit is a significant fraction of the reciprocal of the frequency of said first and second signals.

5. A system according to claim 1, wherein said fourth means comprises means for successively sampling and holding successive samples of said error signal and coupled said successive samples to said adjustable reference carrier source.

6. For use in a multiphase shift keying demodulator of the type including a phase adjustable reference carrier source, and means for demodulating an incoming signal with said reference carrier to provide first and second signals respectively representing the in-phase and quadrature components of said incoming signal, an improved phase synchronization system for controlling said reference carrier comprising, in combination:

first means, responsive to said first and second signals, for detecting the polarities thereof and producing in-phase and quadrature sign signals;

second means, coupled to receive said first signal and said quadrature sign signal, for producing a first product signal, and coupled to receive said second signal and said in-phase sign signal, for producing a second product signal, third means, coupled to said second means, and responsive to said first and second product signals, for producing an error signal representative of the difference between said first and second product signals, and fourth means, coupled to said third means, for generating a control signal to be coupled to said adjustable reference carrier source to control the phase thereof in accordance with the error signal produced by said third means for a decision of the data contents of said incoming signal occurring in time prior to the time of generating said control signal, said four means comprising a sample and hold circuit the sampling rate of which is controlled in accordance with the data rate of said incoming signals.

7. A system according to claim 6, wherein the acquisition time of said sample and hold circuit is a significant fraction of the reciprocal of the frequency of said first and second signals.

8. For use in a multiphase shift keying demodulator of the type including a phase adjustable reference carrier source, and means for demodulating an incoming signal with said reference carrier to provide first and second signals respectively representing the in-phase and quadrature components of said incoming signal, an improved phase synchronization system for controlling said reference carrier comprising, in combination:

first means, responsive to said first and second signals, for detecting the polarities thereof and producing in-phase and quadrature sign signals;

second means, coupled to receive said first signal and said quadrature sign signal, for producing a first product signal, and coupled to receive said second signal and said in-phase sign signal, for producing a second product signal, third means, coupled to said second means, and responsive to said first aand second product signals, for producing an error signal representative of the difference between said first and second product signals, and fourth means, coupled to said third means, for generating a control signal to be coupled to said adjustable reference carrier source to control the phase thereof in accordance with the error signal produced by said third means for a decision of the data contents of said incoming signal occurring in time prior to the time of generating said control signal, said fourth means comprising means for successively sampling and holding successive samples of said error signal and coupling said successive samples to said adjustable reference carrier source.

* * * * *